(12) United States Patent
Özmen

(10) Patent No.: US 11,420,415 B2
(45) Date of Patent: Aug. 23, 2022

(54) THREE DIMENSIONAL SHAPED ARTICLE

(71) Applicant: DSM IP Assets B.V., Heerlen (NL)

(72) Inventor: Murat Özmen, Echt (NL)

(73) Assignee: DSM IP ASSETS B.V., Heerlen (NL)

(*) Notice: Subject to any disclaimer, the term of this patent is extended or adjusted under 35 U.S.C. 154(b) by 94 days.

(21) Appl. No.: 16/493,819

(22) PCT Filed: Mar. 20, 2018

(86) PCT No.: PCT/EP2018/056929
§ 371 (c)(1),
(2) Date: Sep. 13, 2019

(87) PCT Pub. No.: WO2018/172304
PCT Pub. Date: Sep. 27, 2018

(65) Prior Publication Data
US 2020/0009827 A1 Jan. 9, 2020

(30) Foreign Application Priority Data
Mar. 20, 2017 (EP) ...................................... 17161880

(51) Int. Cl.
*B32B 5/26* (2006.01)
*B32B 5/02* (2006.01)
(Continued)

(52) U.S. Cl.
CPC ................ *B32B 5/26* (2013.01); *B32B 5/024* (2013.01); *F41H 5/0478* (2013.01);
(Continued)

(58) Field of Classification Search
CPC ..... B32B 5/024; B32B 5/26; B32B 2260/021; B32B 2260/046; B32B 2262/0253;
(Continued)

(56) References Cited

U.S. PATENT DOCUMENTS

| 6,012,178 A | 1/2000 | Schuster et al. |
| 2008/0268733 A1 | 10/2008 | Pritchard et al. |
| 2009/0149794 A1* | 6/2009 | Tsuruda .................. A61L 15/58 602/54 |

FOREIGN PATENT DOCUMENTS

| GB | 2 042 414 | 9/1980 |
| WO | 01/73173 | 10/2001 |

(Continued)

OTHER PUBLICATIONS

DSM Dyneema product sheet (Dec. 16, 2021, "Dyneema", http://www.matweb.com/search/datasheettext.aspx?matguid=825b415780d24a8997a3f4677dba7409).*

(Continued)

*Primary Examiner* — Yan Lan
(74) *Attorney, Agent, or Firm* — Nixon & Vanderhye P.C.

(57) ABSTRACT

The invention relates to a three dimensional shaped article having an outer and inner surface, the outer surface comprising at least one fabric (100) of polyethylene fibers having a tensile strength of at least 1.5 GPa, the fabric is impregnated with an acrylic based thermoplastic material. The three dimensional shaped article may further comprise monolayers with unidirectional aligned fibers. The three dimensionally shaped article has an improved surface appearance which would therefore need little or no post treatment and has good adhesion to coatings and paints.

16 Claims, 1 Drawing Sheet

Figure 1:
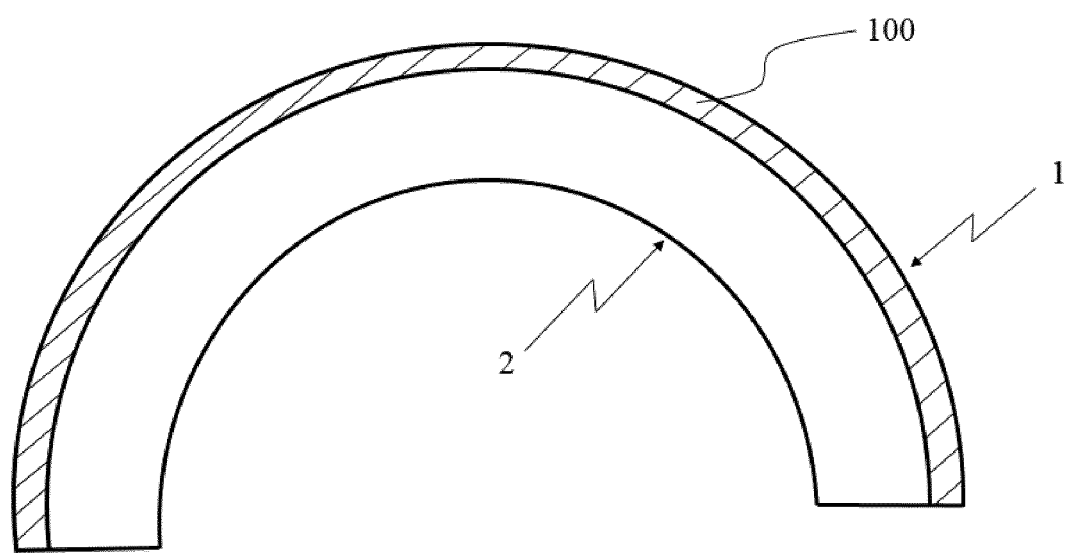

(51) Int. Cl.
  *F41H 5/04* (2006.01)
  *F41H 1/08* (2006.01)

(52) U.S. Cl.
  CPC ... *B32B 2260/021* (2013.01); *B32B 2260/046* (2013.01); *B32B 2262/0253* (2013.01); *B32B 2262/0292* (2013.01); *B32B 2571/02* (2013.01); *F41H 1/08* (2013.01)

(58) Field of Classification Search
  CPC ........ B32B 2262/0292; B32B 2571/02; B32B 1/00; B32B 2250/20; B32B 2255/02; B32B 2262/0223; B32B 2262/0269; B32B 2262/106; B32B 2262/14; B32B 2307/30; B32B 2307/54; B32B 2307/558; B32B 2307/718; B32B 2307/732; B32B 2437/04; B32B 5/022; B32B 5/026; B32B 5/08; B32B 5/262; F41H 1/08; F41H 1/04; F41H 5/0485; F41H 5/0478; B29C 70/083; B29C 70/10; B29C 70/205; B29C 70/222; B29C 70/42; B29K 2101/12
  See application file for complete search history.

(56) References Cited

FOREIGN PATENT DOCUMENTS

| WO | 2007/107359 | 9/2007 |
| WO | 2015/018909 | 2/2015 |
| WO | 2017/081246 | 5/2017 |
| WO | 2017/081270 | 5/2017 |

OTHER PUBLICATIONS

International Search Report for PCT/EP2018/056929, dated Jun. 1, 2018, 4 pages.
Written Opinion of the ISA for PCT/EP2018/056929, dated Jun. 1, 2018, 9 pages.

* cited by examiner

THREE DIMENSIONAL SHAPED ARTICLE

This application is the U.S. national phase of International Application No. PCT/EP2018/056929 filed 20 Mar. 2018, which designated the U.S. and claims priority to EP Patent Application No. 17161880.4 filed 20 Mar. 2017, the entire contents of each of which are hereby incorporated by reference.

The invention relates to a three dimensional shaped article having an outer and inner surface. The invention furthermore relates to a process for the manufacture of a three dimensional shaped article, and to the use of a fabric with polyethylene fibers with an acrylic based thermoplastic material as outer surface for the manufacture of three dimensional shaped articles, preferably for the manufacture of three dimensional shaped impact resistant articles, more preferably for the manufacture of three dimensional shaped ballistic resistant articles.

WO2007107359 describes a three dimensional shaped article comprised of unidirectional polyethylene fibers and a polyurethane matrix material that is made in a process whereby a control member is applied to lower the variability in the product.

Despite the fact that the three dimensional shaped articles of the prior art have a low variability, a further improvement, especially in surface appearance, is sought for.

An objective of the present invention is to provide a three dimensional shaped article with improved surface appearance.

This object is achieved by a three dimensional shaped article having an outer ('1') and inner ('2') surface, the outer surface comprising at least one fabric ('100') comprising polyethylene fibers having a tensile strength of at least 1.5 GPa, the fabric is impregnated with a an acrylic based thermoplastic material.

The three dimensional shaped article according to the invention has an improved surface appearance. An additional advantage of the three dimensional shaped article according to the invention is an improved adhesion of coating layers and paints. This increases the durability of the coated three dimensional shaped article and whereby chipping off or wearing off of coating layer or paint from the article is less likely to occur.

The three dimensional shaped article according to the invention has an outer (1) and inner (2) surface, typically has curvatures in at least 2 directions and may be e.g. a cupola, a dome, a half dome, a hemisphere, a helmet and a canopy.

The at least one fabric (100) used in the invention is preferably a woven fabric with e.g. plain, basket, satin and crow feet weaves, but it may also be a knitted network, or a network formed into a fabric in any of a variety of conventional techniques. An alternative embodiment of the at least one fabric (100) could also be a felt.

The at least one fabric (100) used in the invention comprises polyethylene fibers having a tensile strength of at least 1.5 GPa, preferably at least 2.5 GPa. More preferably the fibers in the fabric have a strength of at least at least 3.5 GPa which results in a better structural rigidity. Even more preferably the fibers in the fabric have a strength of at least 4 GPa for obtaining products with better impact performance, and most preferably at least 4.5 GPa resulting in three dimensional shaped articles with very good ballistic resistant properties.

The polyethylene fibers used in the present invention may suitably be based on linear polyethylene (PE). Linear polyethylene is herein understood to mean polyethylene with less than 1 side chain per 100 C atoms, and preferably with less than 1 side chain per 300 C atoms; a side chain or branch generally containing at most 10 C atoms. The linear polyethylene may further contain up to 5 mol % of one or more other alkenes that are copolymerizable therewith, such as propene, butene, pentene, 4-methylpentene, octene. Preferably, the linear polyethylene is ultra-high molecular mass polyethylene with an intrinsic viscosity (IV, as determined on solutions in decalin at 135° C.) of at least 4 dl/g; more preferably of at least 8 dl/g.

High performance polyethylene (HPPE) fibers consisting of polyethylene filaments that have been prepared by a gel spinning process, such as described, for example, in GB 2042414 A or WO 01/73173, are preferably used in the fabric or the monolayers. A gel spinning process essentially consists of preparing a solution of a linear polyethylene with a high intrinsic viscosity, spinning the solution into filaments at a temperature above the dissolving temperature, cooling down the filaments to below the gelling temperature, such that gelling occurs, and stretching the filaments before, during or after the removal of the solvent. This stretching results in drawn fibers that have a strength of at least 1.5 GPa. If these polyethylene fibers are highly drawn, they have a strength of at least 3.0 GPa.

The at least one fabric (100) used in the invention is preferably impregnated with an acrylic based thermoplastic material. In a special embodiment, the acrylic based thermoplastic material acrylic resin or acrylic polymer has a glass transition temperature Tg of at least 25° C. Thermoplastic materials based on acrylic resins as such are well known in the art. The acrylic resin used in the present invention preferably has a Tg at least 25° C., more preferably at least 35° C., even more preferably at least 45° C., and most preferably at least 55° C. Usually, the Tg of polymer will be within the range of from 25 to 120° C., more usually from 30 to 90° C. In a special embodiment the thermoplastic acrylic resin used in the present invention has a Tg of between 25° C. and 53° C. and is applied as an aqueous dispersion.

A thermoplastic acrylic resin with a Tg of at least 25° C. preferably comprises an acrylic polymer comprising methyl methacrylate, ethyl acrylate and/or butyl acrylate. The acrylic polymer may be based on acid group comprising precursors in an amount of 0-10 wt %, preferably 0.1-8 wt %, more preferably 0.5-7 wt %, even more preferably 0.5-6 wt %, most preferably 0.5-4 wt %, and furthermore may be based on —OH functional monomers in an amount of between 0-30 wt %, preferably between 0-20 wt %, more preferably between 0-15 wt %, even more preferably between 0-10 wt % and most preferably between 1-10 wt %. The number average molecular weight of the acrylic polymer is usually at least 1000 g/mol, more usually at least 2,000 g/mol. The upper limit does not usually exceed 2,000,000 g/mol. Typically the number average molecular weight ranges between 5,000 g/mol and 800,000 g/mol, preferably between 10,000 g/mol and 500,000 g/mol, more preferably between 100,000 g/mol and 500,000 g/mol. In another embodiment, the weight average molecular weight of the acrylic polymer is usually at least 10 000 g/mol, more usually at least 20,000 g/mol. The upper limit does not usually exceed 4,000,000 g/mol. Typically the weight average molecular weight ranges between 15,000 g/mol and 2,500,000 g/mol, preferably between 20,000 g/mol and 2,000,000 g/mol, more preferably between 50,000 g/mol and 1,500,000 g/mol.

The acrylic polymer or acrylic polymer for impregnating the fabric (100) may be an emulsion comprising polymer particle sizes from 20-600 nm, more preferably from 30-400 nm and most preferably from 50-300 nm. This emulsion typically has a pH between 2-11, preferably between 3-10 and more preferably between 4-9. The solid content typically ranges from 10-60 wt %, preferably from 20-55 wt %, most preferably from 30-50 wt %. The mentioned acrylics are described in more detail below. The said acrylic resin or acrylic polymer includes vinyl polymers and preferably comprises (meth)acrylates and optionally also (meth)acrylics, including methyl methacrylate, ethyl acrylate and/or butyl acrylate, and styrene-(meth)acrylates or styrene-(meth)acrylics.

By a vinyl polymer is meant generally herein a polymer derived from the addition polymerization (normally by a free-radical process) of at least one olefinically unsaturated monomer. By a vinyl monomer is therefore meant herein an olefinically unsaturated monomer capable of undergoing free-radical polymerization. The vinyl polymer is preferably formed from 0 to 10 wt. % of at least one vinyl monomer containing an acid functional group(s) (monomer (i)) and from 90 to 100 wt. % of another vinyl monomer not comprised in (i) (monomer (ii)). Examples of such vinyl monomers (ii) include conjugated dienes, optionally substituted dienes; styrene and substituted styrenes; olefines such as ethylene or propylene; vinyl halides; vinyl esters such as vinyl acetate, vinyl propionate, vinyl laurate, and vinyl esters of versatic acid such as VeoVa™ 9 and VeoVa™ 10 (VeoVa is a trademark of Shell); heterocyclic vinyl compounds, dialkyl esters of mono-olefinically unsaturated dicarboxylic acids (such as di-n-butyl maleate and di-n-butyl fumarate; vinyl ethers; and, in particular, esters of acrylic acid and methacrylic acid of formula:

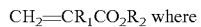

$CH_2=CR_1CO_2R_2$ where $R_1$ is H or methyl and $R_2$ is optionally substituted alkyl of 1 to 20 carbon atoms, preferably 1 to 8 carbon atoms, or cycloalkyl of 5 to 12 ring carbon atoms.

Further specific examples of such monomers include alkyl esters and (chloro)alkyl esters such as methyl a-chloroacrylate, n-propyl a-chloroacrylate, n-butyl a-chloroacrylate, beta-chloroethyl acrylate, beta-chlorobutyl acrylate, methyl (meth)acrylate, ethyl (meth)acrylate, propyl (meth)acrylate (all isomers), butyl (meth)acrylate (all isomers), isobornyl (meth)acrylate, cyclohexyl (meth)acrylate, 2-ethylhexyl (meth)acrylate, octyl (meth)acrylate, lauryl (meth)acrylate, trifluoroethyl(meth)acrylate, diethyl maleate, diethyl fumarate; vinyl esters such as allyl acetate, allyl chloroacetate, methallyl acetate, vinyl acetate, isopropenyl acetate; vinyl halides such as vinyl chloride, vinylidene chloride, allyl chloride, 1,2-dichloropropene-2, methallyl chloride and trichloroethylene; nitriles such as acrylonitrile and methacrylonitrile; vinyl aryls such as styrene, a-methyl styrene, o-methyl styrene, m-methyl styrene, p-methyl styrene, pentachlorostyrene, o-chlorostyrene, m-chlorostyrene, p-chlorostyrene and p-cyanostyrene; conjugated dienes or chlorodienes such as butadiene and chloroprene; and vinyl-substituted heterocyclic imines such as 2-vinyl-pyridine and vinyl carbazole. Other vinyl monomer(s) which may also be used to form vinyl polymer are those bearing a functional group(s) (and not already mentioned above). These can include for example hydroxyl functional monomers such as hydroxyethylacrylate (HEA) and hydroxylethylmethacrylate (HEMA), and olefinically unsaturated amides such as acrylamide, and methacrylamide. The amount of such functional monomer(s) incorporated as part of (iii) is 0 to 20 wt %, preferably 0 to 7 wt %, more preferably 0 to 2 wt %, most preferably 0.1 to 2 wt % based on total monomer composition to form said vinyl polymer. In most cases, however, no such functional monomer(s) is used. Other vinyl monomer(s) which may also be used to form vinyl polymer are those bearing a crosslinkable group(s) (and not already mentioned above). The crosslinkable groups impart crosslinkability either when combined with a crosslinking agent or by reaction with each other. Vinyl monomers carrying crosslinkable groups include for example allyl, glycidyl or acetoacetoxy esters, acetoacetoxy amides, keto and aldehyde functional vinyl monomers, keto-containing amides such as diacetone acrylamide, and silane functional (meth)acrylic monomers. Preferred vinyl monomers carrying crosslinkable groups are acetoacetoxy ethyl methacrylate (AAEM), diacetone acrylamide (DAAM) and silane functional (meth)acrylic monomers and most preferably DAAM. Particularly preferred vinyl monomer(s) (ii) are selected from one or more of methyl methacrylate, n-butyl acrylate, n-butyl methacrylate, ethyl acrylate, ethyl methacrylate, 2-ethylhexyl acrylate, styrene, and acrylonitrile.

The vinyl monomer(s) (i) containing an acid functional group is preferably an olefinically unsaturated monocarboxylic or dicarboxylic acid, examples of which include acrylic acid, methacrylic acid, 2-carboxyethyl acrylate, fumaric acid, maleic acid, itaconic acid, and mono-substituted C1-C20 alkyl esters of dicarboxylic acids. Monocarboxylic acid(s) is preferred and particularly preferred monomer(s) for (i) are one or both of methacrylic acid and acrylic acid.

The vinyl polymers can be prepared by any free radical polymerization method known in the art, such as emulsion or suspension polymerization. Emulsion polymerization is preferred. The polymers can be prepared using the various polymerization methods known in the art such as single batch, sequential and gradient polymerization, also commonly known as a power feed polymerization. If desired, a preformed or in-situ formed seed can be used.

The polymerization of a monomer composition to form a vinyl polymer will normally require the use of a free-radical-yielding initiator(s) to initiate the polymerization Suitable free-radical-yielding initiators include inorganic peroxides such as K, Na or ammonium persulphate, hydrogen peroxide, or percarbonates; organic peroxides, such as acyl peroxides including for example benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used EDTA (EDTA: ethylene diamine tetraacetic acid) may also be usefully employed as part of a redox initiator system. Surfactants can be utilized in order to assist in the dispersion or emulsification of the polymerizing monomers and the resulting vinyl polymer A in water Suitable surfactants include but are not limited to conventional anionic, cationic and/or non-ionic surfactants and mixtures thereof such as Na, K and $NH_4$ salts of dialkylsulphosuccinates, Na, K and NH4 salts of sulphated oils, Na, K and $NH_4$ salts of alkyl sulphonic acids, Na, K and NH4 alkyl sulphates, alkali metal salts of sulphonic acids; fatty alcohols, ethoxylated fatty acids and/or fatty amides, and Na, K and $NH_4$ salts of fatty acids such as Na stearate and Na oleate Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups Non-ionic surfactants include polyglycol ether compounds and preferably polyethylene oxide compounds. The molecular weight Mw of the vinyl polymer can be lowered by using a chain transfer agent (CTA) such as 3-mercapto propionic acid or n-lauryl mercaptane in the polymerization process. Catalytic chain transfer polymerization using specific Co chelate catalysts as CTA can also be used to lower Mw.

The acrylic based thermoplastic material in the present invention is preferably a thermoplastic matrix material based on an acrylic resin or acrylic polymer which preferably has a glass transition temperature of at least 25° C. Alternative embodiments of matrix material may comprise thermosetting equivalents based on acrylic resin or acrylic polymer with a glass transition temperature of at least 25° C. The three dimensional shaped article according to the invention prove to have an improved surface appearance. In this way the article can be coated whereby less primer or surface finishing needs to be applied, or no even no treatment of the surface is needed to even out flaws and folds, before applying a coating.

In the above-mentioned fabric (100), the acrylic based thermoplastic material is present in an amount of at most 70 wt %, preferably at most 60 wt % and more preferably at most 50 wt %. The fabric comprises at least 10%, preferably at least 15 wt %, more preferably at least 20 wt % of the acrylic based thermoplastic material. Typically the acrylic based thermoplastic material is present in the fabric in an amount of between 10-60 wt %, preferably between 20-50 wt %, more preferably between 30-40 wt %.

The weight of the fabric (100) typically varies from 70 $g/m^2$ to 400 $g/m^2$, preferably from 100 $g/m^2$ to 400 $g/m^2$, and more preferably from 150 $g/m^2$ to 300 $g/m^2$.

The three dimensional article according to the invention may comprise two or more layers of the fabric (100). These two or more layers (100) may be directly connected to each other, or may be alternated and connected to other fiber based sheets. A suitable three dimensional shaped article may consist of several layers of fabric (100) whereby the total weight of such an article is between 75 and 750 gram/$m^2$, preferably between 100 and 500 gram/$m^2$. In addition to fabric layer(s) (100), the article according to the invention may comprise other fiber based sheets or layers. Such layers may comprise woven, unidirectional or non woven layers of fibers. Such layers may suitably be based on fibers including polyolefin fibers, ultra-high molecular mass polyethylene fibers, ultra-high molecular mass polypropylene fibers, aramid fibers, ultra-high molecular mass polyvinyl alcohol fibers, fibers from liquid crystalline polymers, or mixtures thereof. Suitable polyolefins are in particular homopolymers and copolymers of ethylene and propylene, which may also contain small quantities of one or more other polymers, in particular other alkene-1-polymers. Preferably the fiber network includes ultra-high molecular mass polyethylene fiber.

In a preferred embodiment, the article comprises furthermore at least one, preferably at least 2 layers with unidirectionally aligned ultra-high molecular mass polyethylene fibers. A layer with unidirectionally aligned fibers embedded in a plastic matrix material is hereinafter referred to as monolayer. The term plastic matrix material means a material, which holds the fibers together and which preferably wholly or at least partially encapsulates the fibers. Such monolayers (also called prepregs by one skilled in the art) and the methods of obtaining such monolayers are disclosed in for instance EP 191306 and WO 95/00318 A1. A monolayer may be obtained by orienting a plurality of fibers in coplanar and parallel fashion in one plane, for instance by pulling a number of fibers or yarns from a fiber bobbin frame over a comb, and impregnating the fibers with the plastic matrix material in a known way before, during or after orienting. In this process, fibers may be used that have previously been coated with a polymer other than the plastic matrix material in order to, for instance, protect the fibers during handling or in order to obtain better adhesion of the fibers onto the plastic of the monolayer. Preferably, uncoated fibers are used. The fibers may have had a treatment before coating or contacting the fibers with the plastic matrix material. Such treatment included plasma or corona treatment.

The weight of a monolayer typically varies from 20 $g/m^2$ to 200 $g/m^2$, preferably from 30 $g/m^2$ to 100 $g/m^2$, preferably from 40 $g/m^2$ to 75 $g/m^2$.

Monolayers are typically stacked such that the direction of the fibers in two subsequent monolayers in the stack typically differs by an angle $\alpha$. Although the angle $\alpha$ may be selected within wide ranges, angle $\alpha$ is preferably between 45 and 135 degrees, more preferably between 65 and 115 degrees and most preferably between 80 and 100 degrees. In the latter preferred range a particularly preferred angle $\alpha$ is about 90 degrees. Stacked monolayers often are commercially available, with e.g. 2, 4 or 6 monolayers, and are referred to as a cross ply in the art.

In a cross ply the fiber network occupies different proportions of the total volume of the sheet. Preferably, however, the fiber network comprises at least about 50 volume % of the composite, more preferably between about 70 volume %, and most preferably at least about 75 volume %, with the matrix optionally occupying the remaining volume.

The term fiber comprises not only a monofilament but, inter alia, also a multifilament yarn or flat tapes. Width of the flat tape preferably is between 2 mm and 100 mm, more preferably between 5 mm and 60 mm, most preferably between 10 mm and 40 mm. Thickness of the flat tape preferably is between 10 μm and 200 μm, more preferably between 25 μm and 100 μm. The flat tape may be composed of a single member of one material, but may also comprise unidirectionally oriented fibers and optionally a matrix material. The tapes may also be made via a gel spinning process, but may also be obtained by a solid state process whereby polymer powder is compacted and drawn to obtain tapes with the desired strength.

The fibers used in the optional monolayers may be the same as the fibers in the fabric (100), or may be different from physical or chemical point of view and have a strength of at least 1.5 GPa, preferably at least 2.5 GPa. More preferably the fibers used in the monolayers have a strength of at least at least 3.5 GPa which results in a good combination of high impact properties and end products with increased rigidity. Even more preferably the fibers used in the network of the present invention have a strength of at least 4 GPa for obtaining products with good ballistic resistant properties, and most preferably at least 4.5 GPa.

Impregnation of unidirectionally aligned fibers with a plastic matrix material can for instance be effected by applying one or more films of the plastic to the top, bottom or both sides of the plane of the fibers and then passing these, together with the fibers, through heated pressure rolls. Preferably, however, the fibers, after being oriented in parallel fashion in one plane, are coated with an amount of a liquid substance containing the plastic matrix material of the monolayer. The advantage of this is that more rapid and better impregnation of the fibers is achieved. The liquid substance may be for example a solution, dispersion or a melt of the plastic. If a solution or a dispersion of the plastic matrix material is used in the manufacture of the monolayer, the process also comprises evaporating the solvent or dispersant, preferably followed by compressing under elevated temperature. Such temperatures and pressures are easily determined by routine experimentation, and typically will be between 70° C. and the melting temperature of the fibers, preferably between 75-135° C., and between 1 and 100 bar, preferably between 5 and 80 bar, more preferably between 10 and 60 bar.

For the manufacture of the monolayers preferably use is made of an aqueous dispersion of the thermoplastic matrix material, whereby water is at least partially, preferably for at least 90 wt %, more preferably for at least 99 wt %, evaporated after application to HPPE fibers.

A special embodiment of the invention relates three dimensionally shaped article comprising a at least one fabric (100) of HPPE fibers impregnated with a thermoplastic acrylic resin with a Tg of at least 25° C., the article further comprising at least two monolayers of unidirectionally aligned HPPE fibers with a matrix. Preferably the HPPE fibers in the fabric or unidirectionally aligned fibers are polyethylene fibers with a strength of at least 3.5 GPa. In a special embodiment, the polyurethane or polyetherurethane is based on aliphatic diisocyanates as this further improves product performance, including its colour stability. The 100% modulus of these plastic matrix materials for unidirectionally aligned fibers is at least 3 MPa. Preferably the 100% modulus is at least 5 MPa. The 100% modulus is generally lower than 500 MPa.

In another preferred embodiment, a suitable alternative matrix material for unidirectionally aligned fibers is Kraton®, applied from an aqueous dispersion. Kraton® polymers comprise a styrene-isoprene-styrene (SIS) triblock copolymer composition with a 100% modulus of 1.4 MPa, and depending on the type of such triblock copolymer maybe even less than 1.4 MPa.

A further preferred embodiment relates to a suitable material for impregnating fabric (100) which is applied as an aqueous suspension of a functionalized homopolymer or copolymer of ethylene and/or propylene, also referred to as polyethylene, polypropylene or copolymers thereof. It may comprise the various forms of polyethylene, ethylene-propylene co-polymers, other ethylene copolymers with co-monomers such as 1-butene, isobutylene, as well as with hetero atom containing monomers such as acrylic acid, methacrylic acid, vinyl acetate, maleic anhydride, ethyl acrylate, methyl acrylate; generally α-olefin and cyclic olefin homopolymers and copolymers, or blends thereof. Preferably it is a copolymer of ethylene or propylene which may contain as co-monomers one or more olefins having 2 to 12 C-atoms, in particular ethylene, propylene, isobutene, 1-butene, 1-hexene, 4-methyl-1-pentene, 1-octene, acrylic acid, methacrylic acid and vinyl acetate. In the absence of co-monomer in the polymeric resin, a wide variety of polyethylene or polypropylene may be used amongst which linear low density polyethylene (LLDPE), very low density polyethylene (VLDPE), low density polyethylene (LDPE), isotactic polypropylene, atactic polypropylene, syndiotactic polypropylene or blends thereof. Functionalization means that the polymer is a functionalized via copolymerization or grafting. Grafting refers to the chemical modification of the polymer backbone mainly with ethylenically unsaturated monomers comprising heteroatoms and whereas functional copolymers refer to the copolymerization of ethylene or propylene with ethylenically unsaturated monomers. Preferably the ethylenically unsaturated monomer comprises oxygen and/or nitrogen atoms. Most preferably the ethylenically unsaturated monomer comprises a carboxylic acid group or derivatives thereof resulting in an acylated polymer, specifically in an acetylated polyethylene or polypropylene. Preferably, the carboxylic reactants are selected from the group consisting of acrylic, methacrylic, cinnamic, crotonic, and maleic, fumaric, and itaconic reactants. Said functionalized polymers typically comprise between 1 and 10 wt % of carboxylic reactant or more. The presence of such functionalization in the resin may substantially enhance the dispersability of the resin and/or allow a reduction of further additives present for that purpose such as surfactants.

The invention further relates to a process for the manufacture of a three dimensional shaped article having an outer and inner surface, comprising the steps of
  (a) providing at least one fabric of polyethylene fibers having a tensile strength of at least 1.5 GPa, the fabric is impregnated with an acrylic based thermoplastic material, whereby at least one fabric forms the outer layer of the article, and
  (b) stacking the product from (a) with at least one optional monolayer of unidirectional aligned fibers
  (c) providing a mold for shaping the 3 dimensional article,
  (d) optionally coating the mold surface with a mold release agent
  (e) positioning the stack of step (b) in the mold, followed by
  (f) compressing the stack at a temperature between 90 and 145° C., preferably at a temperature between 100 and 135° C., at a pressure between 1 and 35 MPa, during a time of between 2 and 60 minutes, followed by
  (g) cooling to a temperature below 80° C., and releasing the so obtained article from the mold It proved that the use of a fabric with polyethylene fibers with an acrylic based thermoplastic material as outer surface for the manufacture of three dimensionally shaped articles including is very beneficial. It not only enables smooth surface of the molded product but also arranges for good paint adhesion.

It furthermore proved that the mold release agent is beneficial for the surface appearance of the product. An alternative option is that a coated mold is used for the manufacture of the three dimensional article according to the invention.

Suitable three dimensional shaped articles that benefit from the present invention include a cupola, a dome, a half dome, a hemisphere, a cap, a construction helmet, a sports helmet, a motor cycle helmet, a ballistic resistant helmet, and a canopy.

In the drawings, FIG. 1 represents a graphic of a cross section of a three dimensional shaped article having an outer (1) and inner (2) surface, the outer surface comprising at least one fabric (100) comprising polyethylene fibers.

TEST PROCEDURES

Polymer number average molecular weight of the acrylic thermoplastic material is determined by gel permeation chromatography according DIN 55672 at 40° C., with tetrahydrofuran as solvent, styrene/divinyl bezene as packing material and calibrated using Polystyrene Mp 160-10,000,000 (polymer standard service (PSS) DIN certified as standard.

The glass transition temperatures of the polymers in the examples use the values in ° C. determined experimentally using differential scanning calorimetry DSC (10 C/min), taking the peak of the derivative curve as Tg.

The modulus of the matrix material was determined according to ISO 527. The 100% modulus was determined on film strips with a length of 100 mm (free length between the clamps) and a width of 24 mm. The 100% modulus is the secant modulus measured between strains of 0% and 100%.

Tensile strength (or strength), are defined and determined on multifilament yarns as specified in ASTM D885M, measured at 25° C. using a nominal gauge length of the fiber of 500 mm, a crosshead speed of 50%/min. On the basis of the measured stress-strain curve the modulus is determined as the gradient between 0.3 and 1% strain. For calculation of the modulus and strength, the tensile forces measured are divided by the titre, as determined by weighing 10 meters of fiber; values in GPa are calculated assuming a density of polyethylene of 0.97 g/cm$^3$.

Intrinsic Viscosity (IV) of polyethylene is determined according to ASTM D1601, at 135° C. in decalin, the dissolution time being 16 hours, with DBPC as anti-oxidant in an amount of 2 g/l solution, by extrapolating the viscosity as measured at different concentrations to zero concentration;

Adhesion testing was done with the 'Gitterschnitt' test per ISO 2409 The test specimen is scratched in a regular pattern at a scratch distance of 1 mm whereby the scratches must be in the coating not in the substrate. A 3M adhesion tape (Scotch™) is applied on the scratch pattern and pulled off subsequently. Good adhesion means that the coating will not come off. Poor adhesion will result in separation of the coating from the substrate.

The amount of separation is visually quantified.

The invention will now be further elucidated with the following comparative experiments and Example, without being limited hereto.

EXAMPLES

Materials:
Fabric: a plain woven fabric with Dyneema® UHMWPE fibers with a strength of 3.5 GPa and with 30 wt. % of Neocryl® (methylmethacrylate acrylic copolymer); total weight of the sheet was 245 g/m$^2$
CF: a plain woven structure of polyethylene fibers in one direction and carbon fibers in the opposite direction, with 31 wt % of polyethylene; total weight of one sheet was 235 g/m$^2$
UD: one sheet consisting of layers of cross plied monolayers with Dyneema® UHMWPE fibers with a strength of 3.5 GPa and 18 wt % of polyurethane resin based on a polyetherdiol and an aliphatic diisocyanate; total weight of the sheet was 145 g/m$^2$ Comparative Experiment A A helmet was produced by stacking 43 sheets UD and pressing these in a mold at a pressure of 175 bar and a temperature of 130° C. during 25 minutes, followed by cooling under pressure to at least 80° C. before releasing from the mold. The mold was sprayed with a mold release agent, before placing the stack in the mold.

After cutting debris from the rim of the helmet, some surface defects occurred due to delamination of some filaments at the outer surface, from the cut rim. Furthermore some folds occurred in the outer surface layer due to the molding process. The helmet was coated with a standard green paint and the surface appearance was visually checked. It was seen that the surface defects could not be mitigated by the paint, the defects still were visible at the outer surface.

Paint adhesion was tested via Gitterschnitt, and proved poor due to chipping-off of paint.

Comparative Experiment B

A helmet was produced in the same was as Comparative experiment A, with 42 sheets UD and one outer layer of CF were pressed.

No folds occurred in the outer surface layer of the helmet; however fiber breakage of the carbon fibers in the CF occurred due to high shear forces in the more vertical part of the helmet. After painting the surface appearance of the helmet was flawed due to the still visible broken fibers in the CF outer layer.

Paint adhesion via Gitterschnitt proved good, no chipping-off of paint occurred.

Example 1

A helmet was produced in the same was as Comparative experiment A, 42 sheets UD and one outer layer of fabric were pressed.

No folds occurred in the outer surface layer of the helmet after pressing; no fiber breakage occurred and the surface was smooth. After painting the surface appearance smooth without defects.

Paint adhesion via Gitterschnitt proved good, no chipping-off of paint.

Only the article according to the invention, as exemplified in Example 1, showed a good surface appearance as can be judged by the smooth surface substantially without wrinkles, before and after painting, as well as good paint adhesion.

The invention claimed is:

1. A three-dimensional shaped article having an outer and inner surface, wherein the outer surface comprises:
   at least one fabric of polyethylene multifilament yarns having a tensile strength of at least 1.5 GPa, wherein the at least one fabric is a woven fabric or a knitted network, and wherein
   the fabric is impregnated with an acrylic based thermoplastic material having a glass transition temperature of at least 25° C.

2. The article according to claim 1, wherein the acrylic based thermoplastic material has a glass transition temperature of at least 35° C.

3. The article according to claim 1, wherein the acrylic based thermoplastic material is present in an amount between 4 and 35 wt %.

4. The article according to claim 1, wherein the yarns are ultrahigh molecular weight polyethylene (UHMWPE) yarns.

5. The article according to claim 1, wherein the fabric is a plain woven fabric.

6. The article according to claim 1, further comprising at least one layer of unidirectionally aligned ultra-high molecular weight polyethylene (UHMWPE) fibers.

7. The article according to claim 1, further comprising at least two layers of unidirectionally aligned ultra-high molecular weight polyethylene (UHMWPE) fibers.

8. The article according to claim 6, wherein the at least one monolayer of unidirectional aligned fibers comprises a matrix material having a 100% modulus of at least 3 MPa.

9. The article according to claim 8, wherein the matrix material is a thermoplastic polyurethane.

10. The article according to claim 1, wherein the article has an areal weight between 75 and 1250 gram per square meter.

11. The article according to claim 1, wherein the article has an areal weight between 125 and 1000 gram per square meter.

12. The article of claim 1, wherein the article is a helmet.

13. The article of claim 1, wherein the article is radome.

14. The article according to claim 7, wherein each of the two monolayers of unidirectionally aligned fibers comprises a matrix material having a 100% modulus of at least 3 MPa.

15. The article according to claim 14, wherein the matrix material is a thermoplastic polyurethane.

16. A process for the manufacture of the three-dimensional shaped article according to claim 1 having an outer and inner surface, wherein the process comprises the steps of:
  (a) providing the at least one fabric forms the outer layer of the article, wherein the at least one fabric is a woven fabric or a knitted network formed of polyethylene multifilament yarns having a tensile strength of at least 1.5 GPa which is impregnated with an acrylic based thermoplastic material having a glass transition temperature of at least 25° C., and
  (b) forming a stack by stacking the at least one fabric provided according to step (a) with at least one optional layer of unidirectional aligned fibers,
  (c) providing a mold for shaping the three dimensional article,
  (d) optionally coating the mold surface with a mold release agent,
  (e) positioning the stack formed according to step (b) in the mold, followed by
  (f) compressing the stack positioned in the mold at a temperature between 90 and 135° C., at a pressure between 1 and 35 MPa, during a time of between 2 and 60 minutes to form a compressed stack, followed by
  (g) cooling the compressed stack to a temperature below 80° C. to thereby provide the three-dimensional shaped article, and releasing the obtained three-dimensional shaped article from the mold.

\* \* \* \* \*